United States Patent
Vakili et al.

(10) Patent No.: US 11,063,754 B2
(45) Date of Patent: Jul. 13, 2021

(54) SYSTEMS, DEVICES, AND METHODS FOR HYBRID SECRET SHARING

(71) Applicant: Huawei Technologies Co., Ltd., Shenzhen (CN)

(72) Inventors: Amirhossein Vakili, Elmira (CA); Yin Tan, Waterloo (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 346 days.

(21) Appl. No.: 15/968,430

(22) Filed: May 1, 2018

(65) Prior Publication Data
US 2019/0342080 A1    Nov. 7, 2019

(51) Int. Cl.
*H04L 9/08* (2006.01)
*H04L 29/06* (2006.01)
*H04L 9/06* (2006.01)
*H04L 9/32* (2006.01)
*H04L 9/30* (2006.01)
*H04L 9/14* (2006.01)

(52) U.S. Cl.
CPC ............ *H04L 9/085* (2013.01); *H04L 9/0631* (2013.01); *H04L 9/0637* (2013.01); *H04L 9/0825* (2013.01); *H04L 9/14* (2013.01); *H04L 9/30* (2013.01); *H04L 9/3247* (2013.01); *H04L 63/045* (2013.01); *H04L 63/0435* (2013.01); *H04L 63/0442* (2013.01)

(58) Field of Classification Search
CPC . H04L 9/085; H04L 63/0428; H04L 63/0435; H04L 63/0442; H04L 63/045
See application file for complete search history.

(56) References Cited

U.S. PATENT DOCUMENTS 5,907,618 A * 5/1999 Gennaro ............... H04L 9/0894
380/277
7,146,009 B2 * 12/2006 Andivahis ............... H04L 63/06
380/277
(Continued)

FOREIGN PATENT DOCUMENTS

CN    106027234 A    10/2016
CN    106850208 A    6/2017
(Continued)

OTHER PUBLICATIONS

Harn, L., et al., "Detection and Identification of Cheaters in (t, n) Secret Sharing Scheme," Designs Codes and Cryptography, Springer Science+Business Media, LLC, Jan. 2009, 10 pages.
(Continued)

*Primary Examiner* — Zachary A. Davis
(74) *Attorney, Agent, or Firm* — Slater Matsil, LLP

(57) ABSTRACT

Systems, devices, and methods for hybrid secret sharing are disclosed. In accordance with embodiments, a computing device may encrypt the secret message using a first encryption key to generate an encrypted secret message. The computing device may also split a second encryption key into a plurality of key shares in accordance with a threshold number. The threshold number is less than or equal to the number of the plurality of key shares. Then, the computing device may transmit a plurality of messages. Each message of the plurality of messages comprises the encrypted secret message and one of the plurality of key shares.

22 Claims, 4 Drawing Sheets

(56) References Cited

U.S. PATENT DOCUMENTS

| | | | |
|---|---|---|---|
| 7,260,552 B2 * | 8/2007 | Riera Jorba | G06Q 20/3674 |
| | | | 380/277 |
| 7,266,699 B2 * | 9/2007 | Newman | G06F 21/6227 |
| | | | 713/182 |
| 7,571,471 B2 * | 8/2009 | Sandhu | H04L 9/0825 |
| | | | 726/17 |
| 9,350,539 B2 * | 5/2016 | Veugen | H04L 9/3013 |
| 9,461,821 B1 * | 10/2016 | Machani | H04L 9/0894 |
| 9,582,671 B2 * | 2/2017 | Ryhorchuk | H04L 9/0894 |
| 9,667,416 B1 | 5/2017 | Machani et al. | |
| 9,673,975 B1 | 6/2017 | Machani | |
| 9,954,680 B1 | 4/2018 | Machani et al. | |
| 9,979,541 B2 * | 5/2018 | Matsushita | H04L 9/085 |
| 10,516,527 B1 * | 12/2019 | Machani | H04L 9/3231 |
| 2014/0195809 A1 * | 7/2014 | Solow | H04L 63/062 |
| | | | 713/171 |
| 2015/0254463 A1 | 9/2015 | Ryhorchuk et al. | |
| 2017/0012948 A1 * | 1/2017 | Peeters | H04L 9/3247 |
| 2021/0111875 A1 * | 4/2021 | Le Saint | H04L 9/085 |

FOREIGN PATENT DOCUMENTS

| | | |
|---|---|---|
| CN | 107623569 A | 1/2018 |
| WO | 2016130030 A1 | 8/2016 |

OTHER PUBLICATIONS

Shamir, A., "How to Share a Secret," Programming Techniques, Communication of the ACM, vol. 22, No. 11, Nov. 1979, 2 pages.

* cited by examiner

SYSTEMS, DEVICES, AND METHODS FOR HYBRID SECRET SHARING

TECHNICAL FIELD

The present disclosure relates generally to cryptography, and in particular embodiments, to techniques and mechanism for systems, devices, and methods for secret sharing of confidential information.

BACKGROUND

Secret sharing (also called secret splitting) refers to an approach for splitting and distributing a secret message amongst a group of participants. Each of the participants is allocated a share of the secret message. The secret message can be reconstructed only when a sufficient number of shares are combined together. Each individual share is of no use on its own for reconstruction of the secret.

In secret sharing, given a secret message (S), a number of needed shares (N), and a threshold number (T), the secret message (S) is split into N shares. The original secret message can be reconstructed from any T number of different shares. Less than the T number of shares does not allow one to gain access to the secret message S. For example, a secret password might be split into three shares (N=3) with a threshold number of two (T=2). The three shares may be distributed among 3 administrators, and each administrator has a different share. Since the threshold number is 2, no single administrator can reconstruct the secret password. At least two administrators are needed to reconstruct the original password from two respective shares distributed to these two administrators.

SUMMARY OF THE INVENTION

Technical advantages are generally achieved by embodiments of this disclosure which describe systems, devices, and methods for hybrid secret sharing of confidential information.

In accordance with embodiments, methods for encrypting a secret message are disclosed. A computing device may encrypt the secret message using a first encryption key to generate an encrypted secret message. The computing device may also split a second encryption key into a plurality of key shares in accordance with a threshold number. The threshold number is less than or equal to the number of the plurality of key shares. Then, the computing device may transmit a plurality of messages. Each message of the transmitted plurality of messages comprises the encrypted secret message and one of the plurality of key shares.

In accordance with embodiments, methods for decrypting an encrypted secret message are disclosed. A computing device may receive a plurality of messages. Each message of the received plurality of messages comprises the encrypted secret message and a different key share of a plurality of key shares. The computing device may determine that at least a threshold number of different key shares required to reconstruct an encryption key are received. Afterwards, the computing device may combine the different key share in each message of the received plurality of messages to reconstruct an encryption key. Then, the computing device decrypts the encrypted secret message using the reconstructed encryption key to generate the secret message.

Computing devices, as well as computer program products, for performing the methods are also provided.

BRIEF DESCRIPTION OF THE DRAWINGS

For a more complete understanding of the present invention, and the advantages thereof, reference is now made to the following description taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. These and other inventive aspects are described in greater detail below.

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the embodiments and ways to operate the embodiments disclosed herein, and do not limit the scope of the disclosure.

Secret sharing is ideal for storing confidential information that is highly sensitive and highly important. Examples of confidential information include confidential documents, encryption keys, missile launch codes, and bank account numbers. Each of these pieces of information must be kept highly confidential, as their exposure could be disastrous. Also, it is critical that these pieces of information should not be lost. Conventional secret sharing splits a secret message (S) into an N number of needed shares, with a threshold number (T) and distributing one or more shares of the secret message to a different participant's computing device for storage thereon. The threshold number (T) is the minimum number of different shares required to reconstruct the original secret message. On the other hand, less than the threshold number (T) of shares are insufficient to reconstruct the original secret message.

Figure 1:
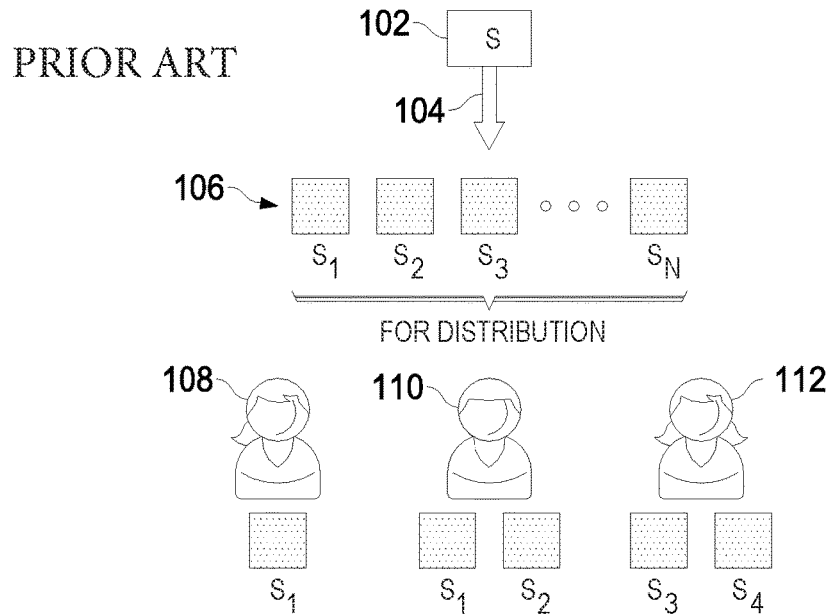
FIG. 1 is a diagram of a conventional secret sharing technique.

FIG. 1 illustrates a diagram of a conventional secret sharing technique. In FIG. 1, splitting operation 104 splits secret message S 102 into N shares 106 ($s_1, s_2, s_3, \ldots, s_N$), with T being the threshold number. Here, secret message S 102 may be a sequence of unencrypted bytes (e.g., clear text) representing confidential information. N may be a positive integer greater than or equal to two. T may be a positive integer greater than or equal to two, and T is less than N. The N shares 106 may be distributed amongst a number of participants in such a way that the only way to reconstruct the secret message S 102 is to have access to at least some number of shares. This number is called the threshold number (T). The secret message S 102 cannot be reconstructed by having access to the number of shares that is less than the threshold number T.

For example, splitting operation 104 may split the secret message S 102 into 4 shares ($s_1, s_2, s_3, s_4$) with 3 being the threshold number (N=4, T=3). At least 3 different shares are required to reconstruct the secret message S 102. The shares may be distributed to 3 administrators (i.e., participants 108, 110, and 112). The shares may be distributed by transmitting, through a network (not shown in FIG. 1), the respective shares to corresponding computing devices used by the 3 administrators. The shares may also be stored in portable persistent storage, such as a portable hard disk drive, a USB thumb drive, and distributed to the 3 other administrators by using the portable persistent storage to transfer the respective shares to corresponding computing devices used by the 3 administrators.

In the example in FIG. 1, administrators 108, 110, and 112 may be assigned different levels of privileges. For example, administrator 108 may only receive share $s_1$, administrator 110 may receive shares $s_1$ and $s_2$, and administrator 112 may receive shares $s_3$ and $s_4$, as illustrated in FIG. 1. Here, the computing device used by each individual administrator does not have enough shares to reconstruct the secret message S 102 because none of the computing devices used by administrators has the threshold number (T=3) of the shares. But, the computing device used by administrators 108 and 112 can combine their respective shares ($s_1, s_3, s_4$) to reconstruct the original secret message S 102. Likewise, the computing device used by administrators 110 and 112 can combine their respective shares ($s_1, s_2, s_3, s_4$) to reconstruct the secret message S 102. However, the computing device used by administrators 108 and 110 cannot combine their respective shares to reconstruct the secret message S 102 because the total number of different shares from administrators 108 and 110 ($s_1, s_2$) is still less than the required threshold number (T=3).

Splitting operation 104 may use a splitting function of the Shamir secret sharing scheme (S4) to split the original secret message S 102. For example, splitting operation 104, running on a splitting computing device, may call an s4_split(S, T, N) function which uses the Shamir secret sharing algorithm to split secret message S 102 into N shares with the threshold number being T. When the original secret message S 102 needs to be reconstructed by a reconstruction computing device, a combining operation (not shown in FIG. 1) may call an s4_combine($\{s_1, s_2, s_3, \ldots, s_T\}$) function to combine shares ($s_1, s_2, s_3, \ldots, s_T$) using the Shamir secret sharing algorithm. Here, ($s_1, s_2, s_3, \ldots, s_T$) is an example of shares sufficient to reconstruct the original secret message S 102. In general, any T number of different shares from the generated shares ($s_1, s_2, s_3, \ldots, s_N$) is sufficient to reconstruct the original secret message S 102. In the example in FIG. 1, the computing devices used by administrators 108 and 112 can combine their respective shares ($s_1, s_3, s_4$), and the combining operation on the reconstruction computing device may call the s4_combine ($\{s_1, s_3, s_4\}$) function to reconstruct the secret message S 102. The details of the Shamir secret sharing scheme are described in the paper by Adi Shamir, How to share a secret, Communications of the ACM, v. 22 n. 11, p. 612-613, November 1979, the entirety of which is hereby incorporated by reference.

Running secret sharing operations of the secret sharing technique described in FIG. 1 can be computationally expensive. Particularly, when the data size of the secret sharing message S 102 becomes large (e.g., number of unencrypted bytes that represent the confidential information becomes large), running a secret sharing operation on the secret message S 102 (e.g., a splitting operation that splits the secret message S 102 into a number of shares) may significantly hinder the performance (e.g., the number of splitting operations per second) of the computing device. Similar computer performance (e.g., the number of combining operations per second) issues could also occur when running a secret sharing operation (e.g., a combining operation) that combines at least T shares to reconstruct the secret message S 102, when the data size of the secret message S 102 is large.

Another technical issue related to conventional secret sharing technique is tampering detection. It is possible that a participant's computing device which has received a share of the secret message, may cheat and try to fool the computing devices of the other share-receiving participants. Currently, there is no technique for tamper detection by accessing only a T number of shares. It is possible that an administrator using its corresponding computing device may tamper a share received by the administrator. When the administrator present their respective shares in the secret message reconstruction phase, the computing device of a dishonest participant (i.e., the cheater) can always exclusively derive the secret message, by presenting the tampered share(s). Thus the other honest participants' computing devices get nothing but a faked secret message. In conventional approaches to detect whether cheating has occurred, access to more than T number of shares is required for tampering detection. For example, in their paper titled "Detection and Identification of Cheaters in (t, n) Secret Sharing," Ham and Lin presented an approach to detect share tampering. The technique proposed by Ham and Lin requires more than a T number of shares to detect that cheating has occurred. So, even though the secret message is split with the intent of T shares being sufficient for reconstructing the secret message, a more than T shares are required for detecting tampering during the reconstruction phase (i.e., message combination operation), creating efficiency problems.

Accordingly, improved secret sharing is needed to enhance the performance of the computing device and efficiently detect possible share tampering without having to access a more than necessary threshold number of shares during the secret reconstruction phase.

To solve the above technical problems, embodiments of this disclosure provide a technical solution that uses an encryption key to encrypt the secret message into an encrypted secret message. The encryption key may be a randomly generated symmetric encryption key that provides authentication. The encryption key may also be a public key of a key pair used for asymmetric encryption. With asymmetric encryption, digital signatures may be used to provide authentication. Rather than splitting the original secret message, embodiments of this disclosure split the encryption key to generate N key shares, with the threshold number being T. Each key share of the generated key shares and the encrypted secret message are included in a respective output message for distribution. On the message reconstruction side, at least T output messages are received, and the corresponding at least T key shares in the received output messages are combined to reconstruct the encryption key. The reconstructed encryption key is then used to decrypt the encrypted message to generate the original secret message. In so doing, the performance of computer operations is improved. Particularly, for secret messages with very large data sizes, the disclosed solution runs faster than conventional secret sharing techniques (e.g. a number of splitting per second and a number of combining operations per second is increased relative to the conventional secret sharing techniques). In addition, as long as less than T shares are modified, the disclosed solution only needs to examine the threshold number (T) of received shares to detect whether a particularly participant has tampered the participant's respective secret share.

Figure 2:
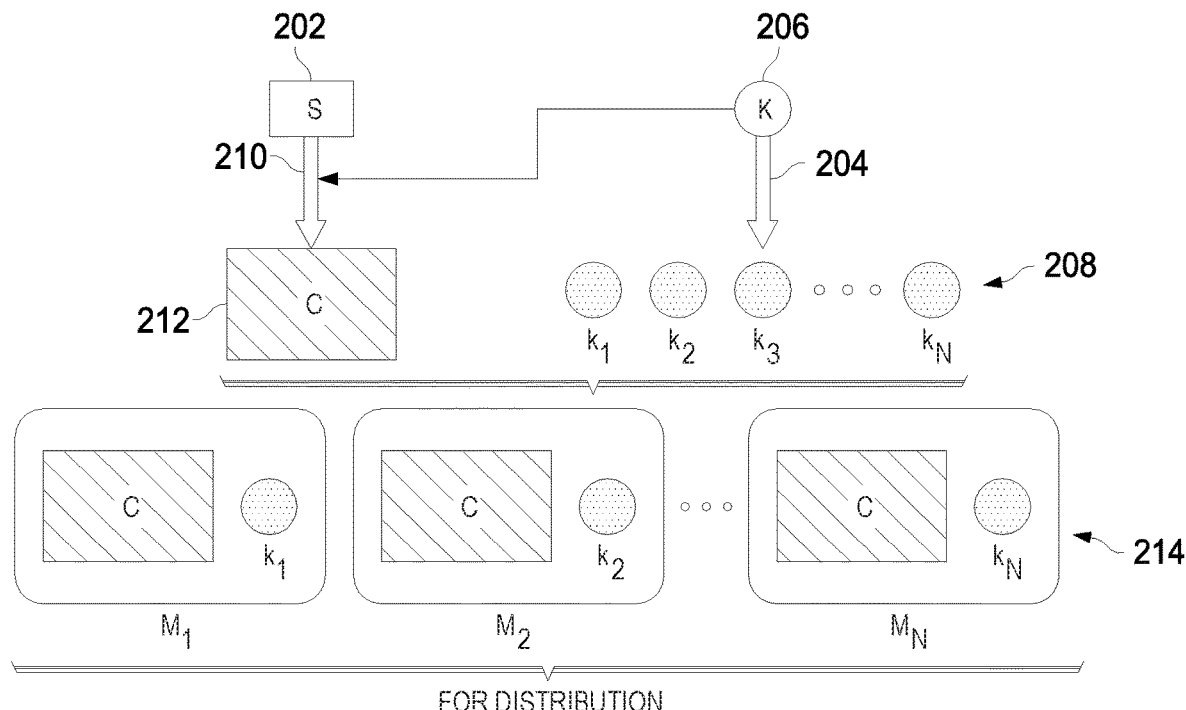
FIG. 2 is a diagram of a hybrid secret sharing technique, according to some embodiments.

FIG. 2 illustrates a diagram of a hybrid secret sharing technique performed by an encryption computing device, according to some embodiments. The encryption computing device may generate a symmetric encryption key K (206) inside a secure memory environment. For example, the encryption computing device may use a pseudo random number generator (PRNG) to generate the symmetric encryption key K 206. Next, encryption operation 210 uses the symmetric encryption key K 206 to encrypt the secret message S (202) to generate the encrypted secret message C (212). Examples of secret message S (202) may include confidential documents, encryption keys, missile launch codes, and bank account numbers.

Encryption operation 210 may use an authenticated encryption algorithm and the symmetric encryption key K 206 to generate the encrypted secret message C 212. The authenticated encryption algorithm may be an Advanced Encryption Standard with a Galois/Counter Mode (AES-GCM) encryption algorithm or an Advanced Encryption Standard with CBC-MAC Mode (AES-CCM) encryption algorithm. For example, encryption operation 210 may call an enc_aes_gcm_256 (data, key, iv, tagSize) function to encrypt the secret message S 202. Here in the function, "data" is the secret message S 202 in plain text (e.g., the data is the unencrypted secret message), "key" is a 256-bit AES key (e.g., the symmetric encryption key K 206), "iv" is an initialization vector, and "tagSize" is the tag size for the AES GCM mode. The output of the function enc_aes_gcm_256 (data, key, iv, tagSize) is the encrypted secret message C 212.

In one example embodiment, in contrast to the conventional secret sharing technique described with respect to FIG. 1, the hybrid secret sharing technique in FIG. 2 does not split the secret message S 202 (or the encrypted secret message C 212). Rather, splitting operation 204 splits the symmetric encryption key K 206 into an N number of key shares 208 ($k_1$, $k_2$, $k_3$, ..., $k_N$), with T being the threshold number. Here, N is a positive number greater than or equal to 2. T is a positive integer greater than or equal to 2, and T is less than N.

Splitting operation 204 may split the symmetric encryption key K 206 in such a way that the only way to reconstruct the symmetric encryption key K 206 is to have access to at least the threshold number (T) of key shares 208. The symmetric encryption key K 206 cannot be reconstructed by having access to the number of shares that is less than the threshold number T. In some embodiments, splitting operation 204 may use a splitting function of the Shamir secret sharing scheme (S4) to split the symmetric encryption key K 206. For example, splitting operation 204 may call an s4_split(K, T, N) function which uses Shamir secret sharing algorithm, as described above, to split the symmetric encryption key K 206 into an N number of key shares 214 with the threshold number being T.

For distribution, the encryption computing device generates N messages 214 ($M_1$, $M_2$, $M_3$, ..., $M_N$). Each message of ($M_1$, $M_2$, $M_3$, ..., $M_N$) includes the encrypted secret message C 212 and a different key share from the N key shares ($k_1$, $k_2$, $k_3$, ..., $k_N$). For example, message $M_1$ includes the encrypted secret message C 212 and key share $k_1$. Message $M_2$ includes encrypted the secret message C 212 and key share $k_2$. Message $M_N$ includes the encrypted secret message C 212 and key share $k_N$.

In general, message $M_i$ may include the encrypted secret message C 212 and key share $k_i$. In one embodiment, each message $M_i$ may include the initialization vector "iv" described above, in addition to the encrypted secret message C 212 and the respective key share $k_i$. To prevent a replay attack, a new "iv" and the encryption key is generated for each sharing. So, the previous shares cannot be re-used.

In FIG. 2, the secret message S 202 is provisioned in a secure memory accessible by a trusted execution environment of the encryption computing device so that the data in secret message S 202 is not leaked. The trusted execution environment may be provided by a trusted computing platform, such as a platform with Intel Software Guard Extensions (SGX), a platform with the AMD Secure Execution Environment, or a platform with TrustZone™. In addition, generation of the symmetric encryption key K 206, the key shares 208, the encrypted secret message 212, and the messages 214 is performed by local function calls in the secure memory. In so doing, there would be no man-in-the-middle attack to the local function calls in the secure memory.

For example, if splitting operation 204 splits symmetric encryption key K 206 into 4 key shares ($k_1$, $k_2$, $k_3$, $k_4$) with 3 being the threshold number (N=4, T=3), at least 3 different key shares are required to reconstruct the symmetric encryption key K 206. The messages 214 may be distributed to 3 administrators 108, 110, and 112 (not shown in FIG. 2). The messages 214 may be distributed by transmitting, through a network (not shown in FIG. 2), the respective messages to corresponding computing devices used by the 3 administrators. The messages 214 may be distributed by using persistent storage devices, such as for example USB thumb drives to carry or distribute the respective messages to corresponding computers used by the 3 administrators.

In this example with respect to FIG. 2, administrators 108, 110, and 112 may have been assigned different levels of privileges. For example, the computing device used by administrator 108 may only receive message $M_1$, the computing device used by administrator 110 may receive messages $M_1$ and $M_2$, and the computing device used by administrator 112 may receive messages $M_3$ and $M_4$. Here, the computing device used by each individual administrator 108, 110, and 112 does not have enough key shares to reconstruct the symmetric encryption key K 206 because none of the computing device used by administrators 108, 110, and 112 has the threshold number (T=3) of the key shares. But, the computing device used by administrators 108 and 112 can combine their respective key shares ($k_1$, $k_3$, $k_4$) to reconstruct the symmetric encryption key K 206. Likewise, the computing device used by administrators 110 and 112 can combine their respective shares ($k_1$, $k_2$, $k_3$, $k_4$) to reconstruct the symmetric encryption key K 206. However, the computing device used by administrators 108 and 110 cannot combine their respective key shares to reconstruct the symmetric encryption key K 206 because the total number of different key shares received by the computing device used by administrators 108 and 110 ($k_1$, $k_2$) is still less than the required threshold number (T=3).

Figure 3:
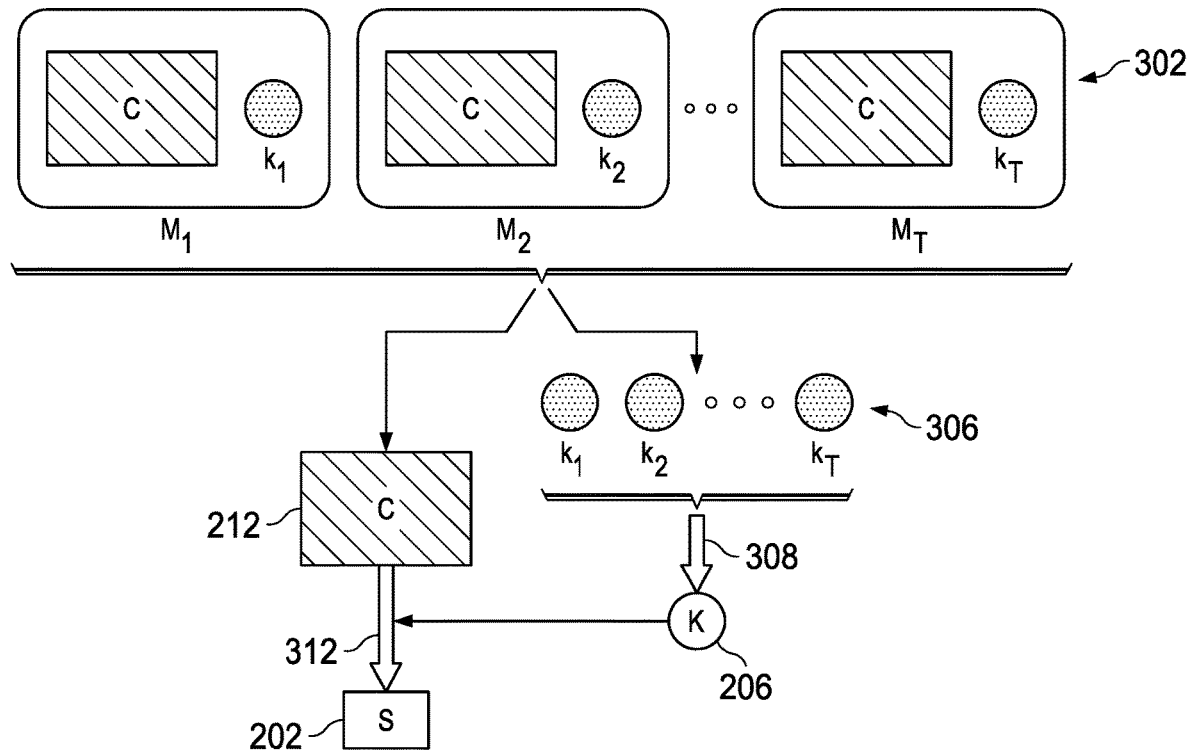
FIG. 3 is a diagram of a hybrid secret sharing technique to reconstruct a secret message, according to some embodiments.

FIG. 3 illustrates a diagram of a hybrid secret sharing technique performed by a decryption computing device to reconstruct the secret message 202, according to some embodiments. The decryption computing device may receive at least a threshold number (T) of messages 302. For simplicity of explanation, FIG. 3 shows a non-limiting example of the decryption computing device receiving messages ($M_1$, $M_2$, $M_3$, ..., $M_T$). In other examples, any T number (or more) of different messages from messages 208 ($M_1$, $M_2$, $M_3$, ..., $M_N$) would be sufficient for reconstructing the secret message 202. For example, when N=4 and T=3, the decryption computing device may receive message ($M_1$) and messages ($M_3$, $M_4$) from administrators 108 and 112, respectively, to reconstruct the secret message 202.

The decryption computing device may receive messages 302 via a network from the computers used by the administrators. The decryption computing device may also receive messages 302 from persistent storage devices, such as for example USB thumb drives carrying messages 302.

Each message of the received messages 302 ($M_1$, $M_2$, $M_3$, ..., $M_T$) includes the encrypted secret message C 212 and a different key share from the T key shares 302 ($k_1$, $k_2$, $k_3$, ..., $k_T$). For example, message $M_1$ includes the encrypted secret message C 212 and key share $k_1$. Message $M_1$ includes the encrypted secret message C 212 and key share $k_2$. Message $M_T$ includes the encrypted secret message C 212 and key share $k_T$. In general, message $M_i$ may include the encrypted secret message C 212 and key share $k_i$.

As illustrated in FIG. 3, from the received T number of messages 302, the decryption computing device may extract key shares 306 ($k_1$, $k_2$, $k_3$, ..., $k_T$) from ($M_1$, $M_2$, $M_3$, ..., $M_N$). Then, combining operation 308 combines key shares 306 ($k_1$, $k_2$, $k_3$, ..., $k_T$) to generate the symmetric encryption key K 206. In one embodiment, combining operation 308 may call an s4_combine({$k_1$, $k_2$, $k_3$, ..., $k_T$}) function that uses the Shamir secret sharing algorithm to generate the symmetric encryption key K 206.

Also, from any one message of messages 302, the decryption computing device may extract the encrypted secret message C 212. Then, decrypting operation 312 may use the generated symmetric encryption key K 206 to decrypt the encrypted secret message C 212 and generate the secret message S 202 (e.g. the original secret message).

In one embodiment, decryption operation 312 may use an authenticated decryption algorithm and the symmetric encryption key K 206 to decrypt the encrypted secret message C 212. The authenticated decryption algorithm may be an AES-GCM decryption algorithm or an AES-CCM decryption algorithm. For example, decryption operation 312 may call a dec_aes_gcm_256(data, key, iv, tagSize) function to decrypt the encrypted secret message C 212. Here in the function, "data" is the encrypted secret message C 212, "key" is a 256-bit AES key (e.g., the symmetric encryption key K 206), "iv" is the initialization vector, and "tagSize" is the tag size for AES GCM mode. The output of the function dec_aes_gcm_256(data, key, iv, tagSize) function is the original secret message S 202 in clear text (e.g., the unencrypted original secret message S 202).

The embodiments described above in FIGS. 2 and 3 use a symmetric encryption key with an authenticated encryption algorithm for hybrid secret sharing. In these embodiments, the same symmetric encryption key K 206 is used for encryption of the secret message S 202 and for decryption of the encrypted secret message C 212.

In other embodiments, hybrid secret sharing technique may utilize asymmetric encryption algorithm to encrypt the secret message and decrypt the encrypted secret message. In this embodiment, the encryption operation 210 may use an asymmetric encryption algorithm that generates a key pair for encryption and decryption. A key pair may include a public key and a private key. The public key is used for encryption of the secret message, and the private key is used for decryption of the encrypted secret message. With respect to FIG. 2, if the hybrid secret sharing technique utilizes an asymmetric encryption algorithm, key K 206 is the private key, and splitting operation 204 splits the private key into the N key shares 208 ($k_1$, $k_2$, $k_3$, ..., $k_N$) to be included in the messages 214 ($M_1$, $M_2$, $M_3$, ..., $M_N$), respectively. However, encryption of the secret message S 202 does not involve the private key 206. Rather, encrypting operation 210 uses the corresponding public key of the key pair to encrypt the secret message S 202 to generate the encrypted secret message C 212. With respect to FIG. 3, combining operation 308 may combine key shares 306 ($k_1$, $k_2$, $k_3$, ..., $k_T$) to generate the private key K 206, and decrypting operation 312 uses the private key K 206 to decrypt the encrypted secret message C 212 to generate the secret message 202 in clear text (e.g., the unencrypted secret message S 202).

In those embodiments that utilize an asymmetric encryption algorithm for hybrid secret sharing technique, authentication may be achieved through digital signatures. In one non-limiting embodiment, the encrypting computing device may generate a second key pair. The second key pair may include a second private key and a second public key. For each respective message of the plurality of messages 214, the encrypting computing device may generate a digital signature using the second private key of the second key pair, and include the generated digital signature in the respective message in ($M_1$, $M_2$, $M_3$, ..., $M_N$) for later authentication of the respective message by the decryption computing device.

Figure 4:
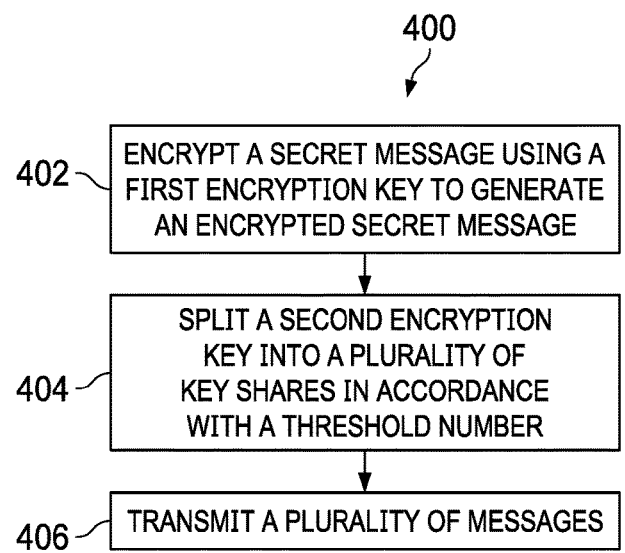
FIG. 4 is a flowchart of a method for an encryption computing device to perform hybrid secret sharing of a secret message, according to some embodiments.

FIG. 4 illustrates a flowchart of method 400 for an encryption computing device to perform hybrid secret sharing of a secret message, according to some embodiments. Method 400 may be carried out or performed by routines, subroutines, or modules of software executed by one or more processors of the encryption computing device. Coding of the software for carrying out or performing method 400 is well within the scope of a person of ordinary skill in the art having regard to the present disclosure. The method may include additional or fewer operations than those shown and described and may be carried out or performed in a different order. Computer-readable code or instructions of the software executable by the one or more processor of the encryption computing device may be stored on a non-transitory computer-readable medium, such as for example, memory of the encryption computing device. Method 400 starts at operation 402, where the encryption computing device may encrypt a secret message using a first encryption key to generate an encrypted secret message. The secret message may be generated in a secure memory of the encryption computing device to prevent information leaking of the secret message.

At operation 404, the encryption computing device may split a second encryption key into a plurality of key shares in accordance with a threshold number. The threshold number may be less than or equal to the number of the plurality of key shares. At least the threshold number of different key shares from the plurality of key shares are required to reconstruct the second encryption key.

In one embodiment, the first encryption key may be a symmetric encryption key and the second encryption key may be identical to the first encryption key. In other words, the first encryption key and the second encryption key may be the same symmetric encryption key used in a symmetric encryption algorithm. In this embodiment, the encryption computing device may encrypt the secret message using an authenticated encryption algorithm and the symmetric encryption key to generate the encrypted secret message. The authenticated encryption algorithm may be an Advanced Encryption Standard with a Galois/Counter Mode (AES-GCM) encryption algorithm or an Advanced Encryption Standard with CBC-MAC Mode (AES-CCM) encryption algorithm.

In another non-limiting embodiment, the first encryption key may be a public key of a key pair for asymmetric encryption, and the second encryption key may be a private key of the key pair. The encrypting computing device may generate a second key pair. The second key pair may include a second private key and a second public key. For each respective message of the plurality of messages, the encrypting computing device may generate a digital signature using the second private key of the second key pair and include the generated digital signature in the respective message for authenticating the respective message later on the reconstruction side.

In some embodiments, the encryption computing device may split the second encryption key into the plurality of key shares using a Shamir secret sharing scheme splitting function.

At operation 406, the encryption computing device may transmit a plurality of messages. Each message of the plurality of messages may comprise the encrypted secret message and a different one of the plurality of key shares.

Figure 5:
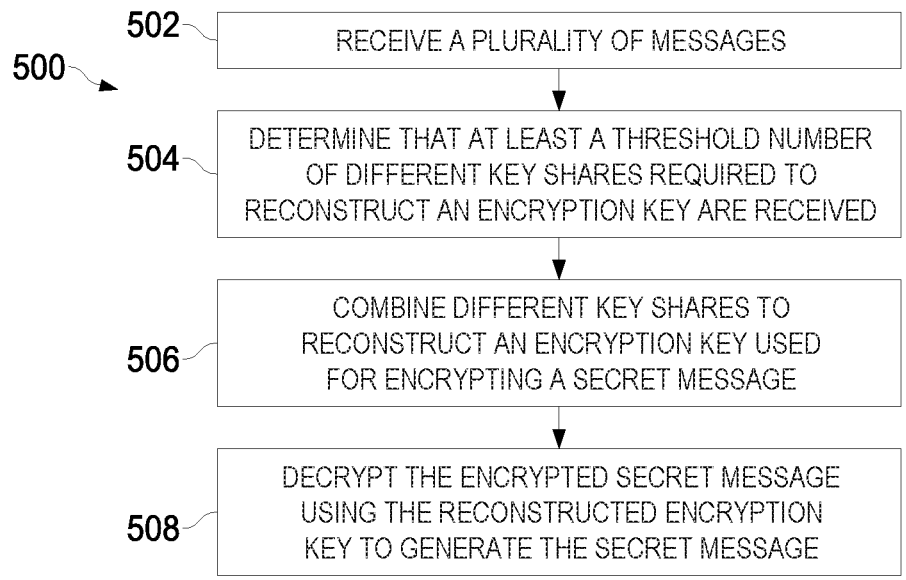
FIG. 5 is a flowchart of a method for a decryption computing device to perform hybrid secret sharing and reconstruct an encrypted secret message, according to some embodiments.

FIG. 5 illustrates a flowchart of method 500 for a decryption computing device to perform hybrid secret sharing of an encrypted secret message, according to some embodiments. Method 500 may be carried out or performed by routines, subroutines, or modules of software executed by one or more processors of the decryption computing device. Coding of the software for carrying out or performing method 500 is well within the scope of a person of ordinary skill in the art having regard to the present disclosure. The method may include additional or fewer operations than those shown and described and may be carried out or performed in a different order. Computer-readable code or instructions of the software executable by the one or more processor of the encryption computing device may be stored on a non-transitory computer-readable medium, such as for example, memory of the decryption computing device. Method 500 starts at operation 502, where the decryption computing device may receive a plurality of messages. Each of the received plurality of messages may comprise the encrypted secret message and a different key share of a plurality of key shares.

At operation 504, the decryption computing device may determine that at least a threshold number of different key shares required to reconstruct an encryption key are received in the received plurality of messages.

If at least the threshold number of different key shares are received, then, at operation 506, the decryption computing device may combine the different key share in each message of the received plurality of messages to reconstruct the encryption key. In some embodiments, the decryption computing device may use a Shamir secret sharing scheme combining function to combine the different key share in each of the plurality of messages to generate the encryption key.

Next, at operation 508, the decryption computing device may decrypt the encrypted secret message using the reconstructed encryption key to generate a secret message. In some embodiments, the decryption computing device may authenticate each message of the received plurality of messages prior to decrypting the encrypted secret message. In one embodiment, for each message of the received plurality of messages, the decryption computing device may report tampering of the received plurality of messages when at least one of the received plurality of messages is not authenticated. In another embodiment, for each message of the received plurality of messages, the decryption computing device may report tampering of the received plurality of messages when a digital signature included in at least one of the received plurality of messages is not authenticated.

In some embodiments, the reconstructed encryption key may be a symmetric encryption key for encrypting the secret message using an authenticated encryption algorithm. The decrypting device may decrypt the encrypted secret message using the reconstructed symmetric encryption key and one of an Advanced Encryption Standard with a Galois/Counter Mode (AES-GCM) decryption algorithm or an Advanced Encryption Standard with CBC-MAC Mode (AES-CCM) encryption algorithm to generate the secret message. The decryption computing device may detect tampering based on the result of the decrypting the encrypted secret message. For example, the decryption computing device may call a dec_aes_gcm_256(C, K, iv, 256) function to decrypt the encrypted message C using the symmetric encryption key K, with iv being the initialization vector and the tag size being 256. If the decryption operation fails, the decryption computing device may detect tampering and report such tampering.

In some embodiments, the reconstructed encryption key is a private key of a key pair for asymmetric encryption. The key pair comprises the private key and a corresponding public key.

Figure 6:
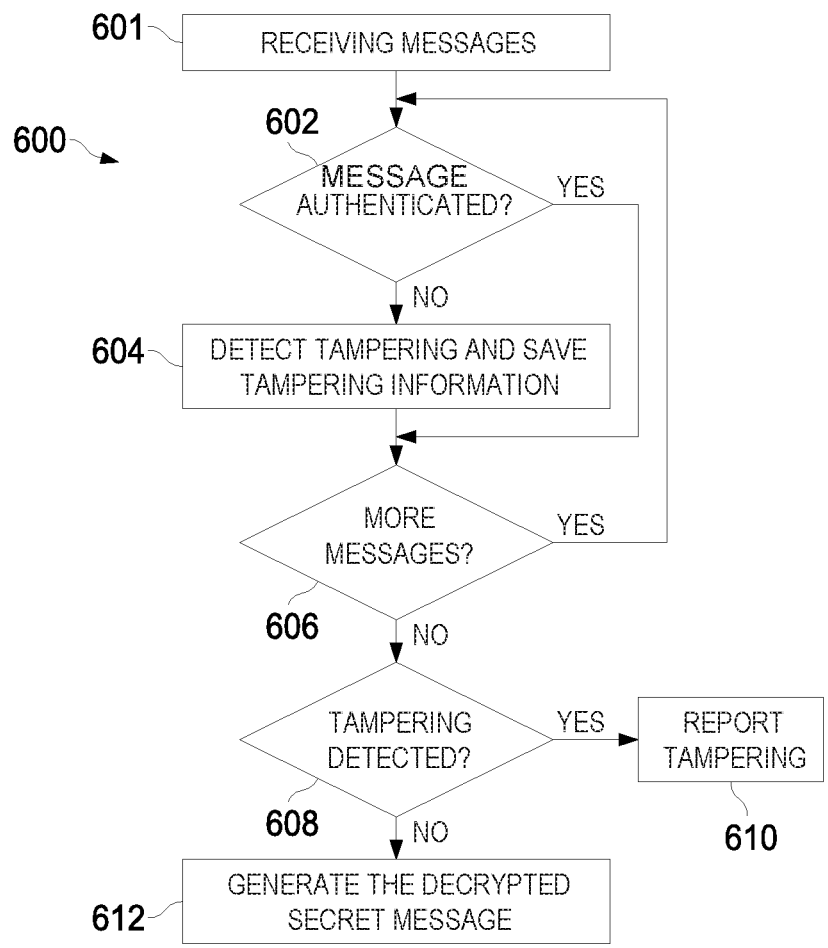
FIG. 6 is a flowchart of a method for a decryption computing device to detect message tampering, according to some embodiments.

FIG. 6 illustrates a flowchart of method 600 for a decryption computing device to detect message tampering using hybrid secret sharing, according to some embodiments. Method 600 may be carried out or performed by routines, subroutines, or modules of software executed by one or more processors of the decryption computing device. Coding of the software for carrying out or performing method 600 is well within the scope of a person of ordinary skill in the art having regard to the present disclosure. The method may include additional or fewer operations than those shown and described and may be carried out or performed in a different order. Computer-readable code or instructions of the software executable by the one or more processor of the encryption computing device may be stored on a non-transitory computer-readable medium, such as for example, memory of the decryption computing device. Method 600 starts at operation 601, where the decryption computing device may receive a plurality of messages. Each of the received plurality of messages may comprise the encrypted secret message and a different key share of a plurality of key shares.

At operation 602, the decryption computing device may authenticate a message of the received plurality of messages. In one embodiment, the decryption computing device may determine whether the message is authenticated. In another embodiment, the decryption computing device may determine whether a digital signature included in the message is authenticated.

If the message is not authenticated, at operation 604, the decryption computing device may detect tampering. In one embodiment, method 600 may report tampering as soon as the method detects that one message has been tampered, and method 600 may end (not shown in FIG. 6).

In another embodiment, the decryption computing device may wait until finishing checking authentication of all the received messages before reporting tampering. In this embodiment, after the decryption computing device detects tampering of a received message at operation 604, the decryption computing device may save the tampering status information related to the received message. Method 600 may then proceed to operation 606.

If the received message is authenticated, method 600 may also proceed to operation 606. At operation 606, the decryption computing device may check whether there are more received messages to be authenticated. If so, method 600 returns to operation 602 to authenticate the next received message. If there are no more received messages left to be authenticated, at operation 608, the decryption computing device check whether tampering has been detected for one or more received messages, based on the saved tampering information from operation 604. If tampering has been detected for at least one of the received messages, the decryption computing device may report such tampering at operation 610. If tampering has not been detected in any of the received messages, at operation 612, the decryption computing device may proceed to generate the decrypted secret message using techniques such as the one described with respect to FIG. 5.

In another embodiment, the decryption computing device may detect tampering based on the result of the decrypting the encrypted secret message. For example, if a symmetric encryption key has been constructed from at least the threshold number of key shares, the decryption computing device may call a dec_aes_gcm_256(C, K, iv, 256) function to decrypt the encrypted message C using the symmetric encryption key K, with iv being the initialization vector and the tag size being 256. If the decryption operation fails, the decryption computing device may detect tampering and report the tampering.

Figure 7:
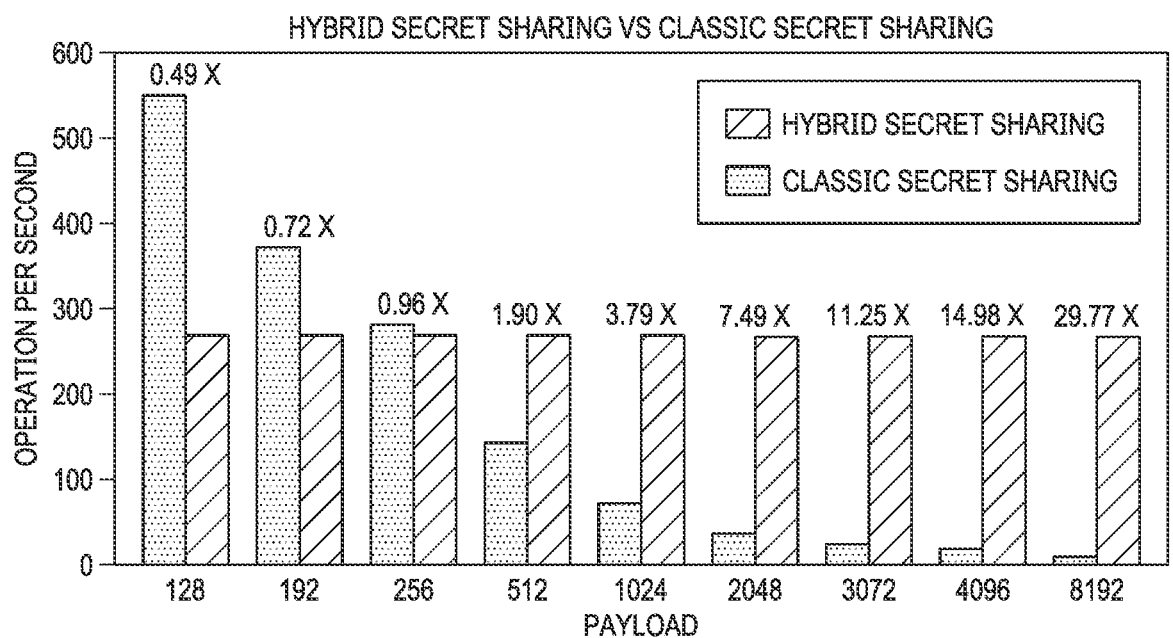
FIG. 7 is a graph illustrating how the performance of one embodiment implementation of hybrid secret sharing is compared to the performance of a conventional approach of splitting the secret message using the Shamir secret sharing scheme.

FIG. 7 illustrates a graph of how the performance of one embodiment implementation of the hybrid secret sharing technique of the present disclosure is compared to the performance of the conventional approach of splitting the secret message, using the Shamir secret sharing scheme. In FIG. 7, the horizontal axis shows the data size of the secret messages. The vertical axis shows the number of splitting operations per second, which is directly proportional to the performance of the encryption computing device. As shown in FIG. 7, for the conventional secret sharing approach of splitting the secret message, using the Shamir secret sharing scheme, the larger the data size of the secret message, the less the splitting operations per second can be performed by the encryption computing device (i.e., the lower the computer performance). For secret messages having data sizes over 256 bits, the hybrid secret sharing technique of the present disclosure outperforms the conventional approach of splitting the secret message, using the Shamir secret sharing scheme. For example, if the data size of a secret message is 8192 bits, the example hybrid secret sharing technique can perform almost 30 times as many splitting operations as the conventional approach of splitting the secret message, using the Shamir secret sharing scheme.

Figure 8:
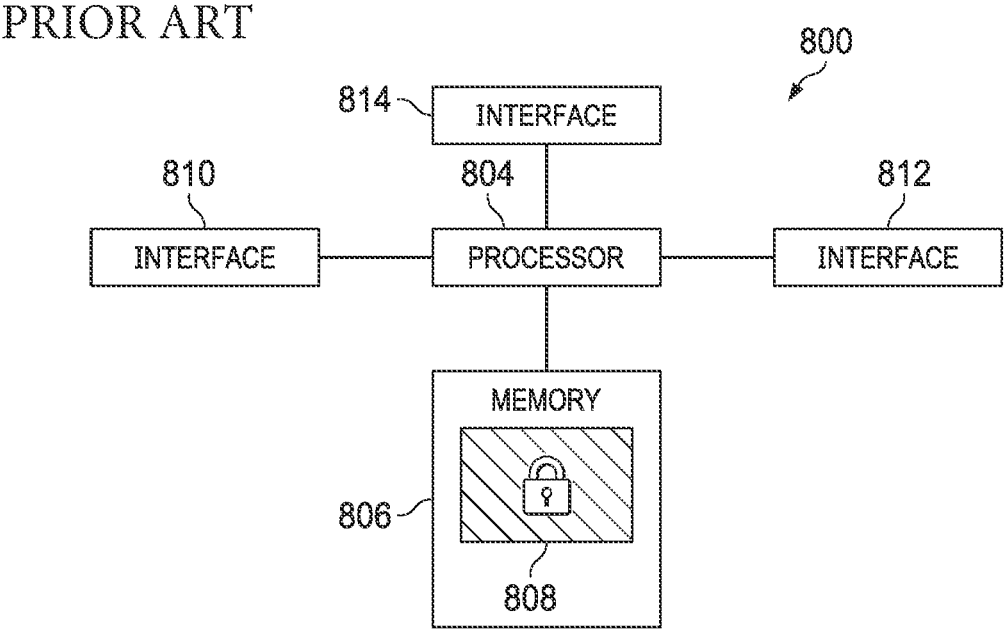
FIG. 8 is a diagram of an embodiment processing system.

FIG. 8 is a block diagram of an embodiment processing system 800 for performing methods 400, 500, 600 described herein, which may be a part of a computing device, such as the encryption computing device, the decryption computing device, and the computing devices using by the administrators. As shown, the processing system 800 includes a processor 804, a memory 806, and interfaces 810-814, which may (or may not) be arranged as shown in FIG. 8. The processor 804 may be any component or collection of components adapted to perform computations and/or other processing related tasks, and the memory 806 may be any component or collection of components adapted to store programming and/or instructions for execution by the processor 804. The memory 806 may include a non-transitory computer readable medium. In an embodiment, the memory 806 includes a secure memory 808 accessible only by a trusted execution environment of processing system 800. The trusted execution environment may include secure memory 808 storing secure data. Trusted applications may also be stored in secure memory 808 for accessing the secure data in secure memory 808. The interfaces 810, 812, 814 may be any component or collection of components that allow the processing system 800 to communicate with other devices/components and/or a user. For example, one or more of the interfaces 810, 812, 814 may be adapted to communicate data, control, or management messages from the processor 804 to applications installed on the host device and/or a remote device. As another example, one or more of the interfaces 810, 812, 814 may be adapted to allow a user or user device (e.g., personal computer (PC), laptop computer, smartphone, tablet, etc.) to interact/communicate with the processing system 800. The processing system 800 may include additional components not depicted in FIG. 8, such as long term storage (e.g., non-volatile memory, etc.).

In some embodiments, the processing system 800 is included in a network device that is accessing, or part otherwise of, a telecommunications network. In one example, the processing system 800 is in a network-side device in a wireless or wireline telecommunications network, such as a base station, a relay station, a scheduler, a controller, a gateway, a router, an applications server, or any other device in the telecommunications network. In other embodiments, the processing system 800 is in a user-side device accessing a wireless or wireline telecommunications network, such as a mobile station, a user equipment (UE), a personal computer (PC), a tablet, a wearable communications device (e.g., a smart watch, etc.), or any other device adapted to access a telecommunications network.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal, message, or key such as secret message S 202, symmetric encryption key K (206), encrypted secret message C 212, may be processed by a processing unit or a processing module. Also, encryption operation 210, decryption operation 312, splitting operation 204, and combining operation 308 may be performed by a processing unit or processing module. Other steps may be performed by an identifying unit/module and/or a determining unit/module. The respective units/modules may be hardware, software, or a combination thereof. For instance, one or more of the units/modules may be an integrated circuit, such as field programmable gate arrays (FPGAs) or application-specific integrated circuits (ASICs).

As described above, the disclosed hybrid secret sharing solution provides two major advantages over the conventional secret sharing approaches. First, hybrid secret sharing techniques can be performed much faster than conventional secret sharing approaches. So, the hybrid secret sharing techniques of the present disclosure are more suitable for distributing secret messages with a large data size. Second, the hybrid secret sharing techniques can more efficiently detect information tampering by examining only the threshold number of shares.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for encrypting a secret message, comprising:
   encrypting, by a computing device, the secret message using a first public key of a first key pair for asymmetric encryption to generate an encrypted secret message;
   splitting, by the computing device, a first private key of the first key pair into a plurality of key shares in accordance with a threshold number, wherein the first private key is different from the first public key, wherein the threshold number is less than a quantity of the plurality of key shares, and wherein the threshold number is a minimum number of key shares required to reconstruct the first private key for decrypting the encrypted secret message; and
   transmitting, by the computing device, the plurality of key shares in a plurality of messages, wherein each message of the plurality of messages comprises the encrypted secret message and a different one of the plurality of key shares, wherein the transmitting comprises:
      transmitting, by the computing device to a receiving device, a first message and a second message of the plurality of messages, wherein the first message includes the encrypted secret message and a first key share of the plurality of key shares, and wherein the second message includes the encrypted secret message and a second key share of the plurality of key shares.

2. The method of claim 1, further comprising:
   generating, by the computing device, a second key pair comprising a second private key and a second public key, the second key pair being different from the first key pair; and
   for each respective message of the plurality of messages:
      generating, by the computing device, a digital signature for authenticating the respective message including the encrypted secret message and a key share using the second private key of the second key pair; and
      including, by the computing device in the respective message, the generated digital signature.

3. The method of claim 1, wherein the splitting comprises splitting the first private key, using a Shamir secret sharing scheme splitting function, into the plurality of key shares.

4. The method of claim 1, wherein the secret message is generated in a secure memory of the computing device.

5. The method of claim 1, wherein the plurality of messages are transmitted to a plurality of receiving devices, and wherein a number quantity of the plurality of receiving computing devices is less than a number quantity of the plurality of messages each including the encrypted secret message.

6. The method of claim 1, wherein the encrypting comprises:
   encrypting, by the computing device, the secret message using at least a first local function call in a secure memory, and wherein the splitting comprises: splitting, by the computing device, the first private key into the plurality of key shares using at least a second local function call in the secure memory.

7. A method for decrypting an encrypted secret message, comprising:
   receiving, by a computing device, a plurality of messages, wherein each message of the plurality of messages comprises the encrypted secret message and a different key share of a plurality of key shares split from a first private key of a first key pair for asymmetric encryption, wherein the encrypted secret message is encrypted using a first public key of the first key pair;
   determining that a quantity of the plurality of messages is at least a threshold number, wherein the threshold number is a minimum number of key shares required to reconstruct the first private key for decrypting the encrypted secret message, wherein the threshold number is less than a quantity of the plurality of key shares, and wherein the first private key is different from the first public key;
   combining, by the computing device, the different key share in each message of the plurality of messages to reconstruct the first private key; and
   decrypting, by the computing device, the encrypted secret message using the reconstructed first private key to generate a secret message.

8. The method of claim 7, further comprising:
   prior to the decrypting, authenticating each message of the plurality of messages.

9. The method of claim 8, wherein the authenticating comprises:
   for each message of the plurality of messages, reporting, by the computing device, tampering of the plurality of messages when at least one of the plurality of messages is not authenticated.

10. The method of claim 8, wherein the authenticating comprises:
    for each message of the plurality of messages, reporting, by the computing device, tampering of the plurality of messages when a digital signature included in at least one of the plurality of messages is not authenticated.

11. The method of claim 7, further comprising:
    detecting tampering based on a result of the decrypting the encrypted secret message.

12. The method of claim 7, wherein the combining comprises combining, using a Shamir secret sharing scheme combining function, the different key share in each of the plurality of messages to generate the first private key.

13. A computing device, comprising:
    a processor;
    a non-transitory computer readable storage medium storing programming for execution by the processor, the programming including instructions to perform operations for encrypting a secret message, and wherein the operations comprise:
- encrypting the secret message using a first public key of a first key pair for asymmetric encryption to generate an encrypted secret message;
- splitting a first private key of the first key pair into a plurality of key shares in accordance with a threshold number, wherein the first private key is different from the first public key, wherein the threshold number is less than a quantity of the plurality of key shares, and wherein the threshold number is a minimum number of key shares required to reconstruct the first private key for decrypting the encrypted secret message; and
- transmitting the plurality of key shares in a plurality of messages, wherein each message of the plurality of messages comprises the encrypted secret message and a different one of the plurality of key shares, wherein the transmitting comprises:
  - transmitting, to a receiving device, a first message and a second message of the plurality of messages, wherein the first message includes the encrypted secret message and a first key share of the plurality of key shares, and wherein the second message includes the encrypted secret message and a second key share of the plurality of key shares.

14. The computing device of claim 13, wherein the operations further comprise:
- generating a second key pair comprising a second private key and a second public key, the second key pair being different from the first key pair; and
- for each respective message of the plurality of messages:
  - generating a digital signature for authenticating the respective message including the encrypted secret message and a key share using the second private key of the second key pair; and
  - including, in the respective message, the generated digital signature for authenticating the respective message.

15. The computing device of claim 13, wherein the splitting comprises splitting the first private key, using a Shamir secret sharing scheme splitting function, into the plurality of key shares.

16. The computing device of claim 13, wherein the secret message is generated in a secure memory of the computing device.

17. A computing device, comprising:
a processor;
a non-transitory computer readable storage medium storing programming for execution by the processor, the programming including instructions to perform operations for decrypting an encrypted secret message, and wherein the operations comprise:
- receiving a plurality of messages, wherein each message of the plurality of messages comprises the encrypted secret message and a different key share of a plurality of key shares split from a first private key of a first key pair for asymmetric encryption, wherein the encrypted secret message is encrypted using a first public key;
- determining that a quantity of the plurality of messages received is at least a threshold number, wherein the threshold number is a minimum number of key shares required to reconstruct the first private key for decrypting the encrypted secret message, wherein the threshold number is less than a quantity of the plurality of key shares, and wherein the first private key is different from the first public key;
- combining the different key share in each message of the plurality of messages to reconstruct the first private key; and
- decrypting the encrypted secret message using the reconstructed first private key to generate a secret message.

18. The computing device of claim 17, wherein the operations further comprise:
- prior to the decrypting, authenticating each message of the plurality of messages.

19. The computing device of claim 18, wherein the authenticating comprises:
- for each message of the plurality of messages, reporting tampering of the plurality of messages when at least one of the plurality of messages is not authenticated.

20. The computing device of claim 18, wherein the authenticating comprises:
- for each message of the plurality of messages, reporting tampering of the plurality of messages when a digital signature included in at least one of the plurality of messages is not authenticated.

21. The computing device of claim 17, wherein the operations further comprise:
- detecting tampering based on a result of the decrypting the encrypted secret message.

22. The computing device of claim 17, wherein the combining comprises combining, using a Shamir secret sharing scheme combining function, the different key share in each of the plurality of messages to generate the first private key.

* * * * *

UNITED STATES PATENT AND TRADEMARK OFFICE
CERTIFICATE OF CORRECTION

PATENT NO. : 11,063,754 B2
APPLICATION NO. : 15/968430
DATED : July 13, 2021
INVENTOR(S) : Amirhossein Vakili Page 1 of 1

It is certified that error appears in the above-identified patent and that said Letters Patent is hereby corrected as shown below:

In the Claims

In Claim 5, Column 14; Line 5 delete "number"

Signed and Sealed this
Seventh Day of September, 2021

Drew Hirshfeld
*Performing the Functions and Duties of the
Under Secretary of Commerce for Intellectual Property and
Director of the United States Patent and Trademark Office*